J. DURIEUX.
DOUBLE RING FOR GLASS FACTORIES.
APPLICATION FILED JULY 15, 1919. RENEWED JULY 20, 1920.
1,367,027.
Patented Feb. 1, 1921.
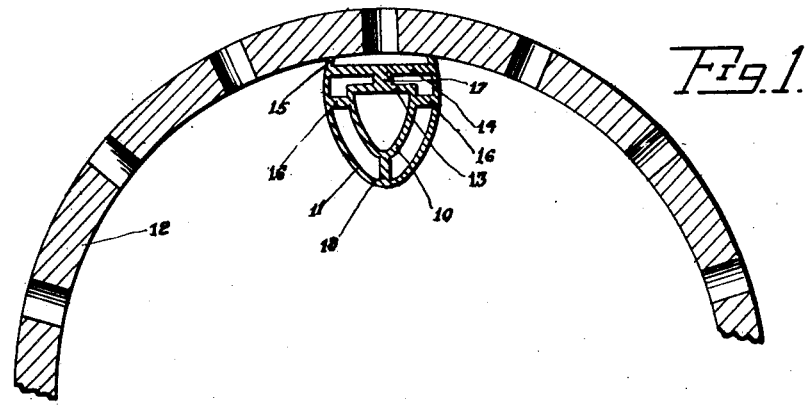
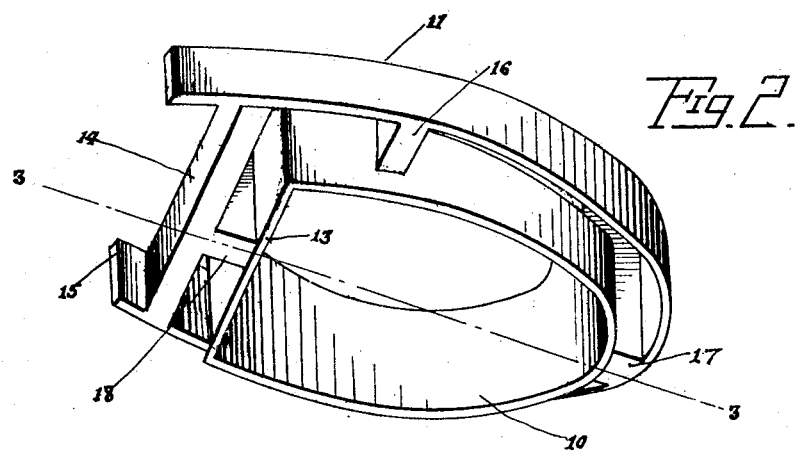
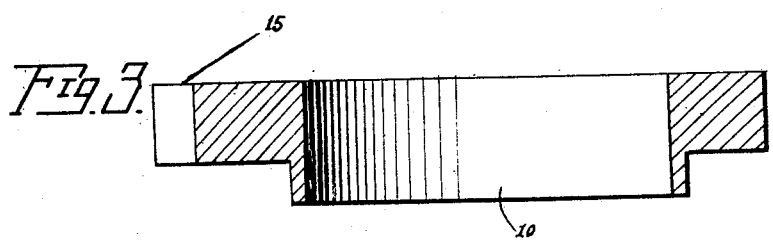
Inventor
Joseph Durieux
Attorney

UNITED STATES PATENT OFFICE.

JOSEPH DURIEUX, OF NEW EAGLE, PENNSYLVANIA.

DOUBLE RING FOR GLASS FACTORIES.

1,367,027.  Specification of Letters Patent.  Patented Feb. 1, 1921.

Application filed July 15, 1919, Serial No. 310,961. Renewed July 20, 1920. Serial No. 397,707.

*To all whom it may concern:*

Be it known that I, JOSEPH DURIEUX, a citizen of the United States, residing at New Eagle, in the county of Washington, State of Pennsylvania, have invented certain new and useful Improvements in Double Rings for Glass Factories; and I do hereby declare the following to be a full, clear, and exact description of the invention, such as will enable others skilled in the art to which it appertains to make and use the same.

This invention relates to new and useful improvements in devices used in the drawing of glass and particularly to drawing rings.

One object of the present invention resides in the provision of a novel and improved drawing ring which combines features whereby stones and other foreign substances will be automatically excluded from the innermost portion of the ring and whereby the drawing ring will be prevented from getting too near the edge of the tank.

Other objects and advantages will be apparent from the following description when taken in connection with the accompanying drawing.

In the drawing:

Figure 1 is a horizontal sectional view through a portion of a glass melting tank showing the improved drawing ring in position therein.

Fig. 2 is an inverted perspective view of the drawing ring removed from the tank.

Fig. 3 is a vertical longitudinal central sectional view taken through the drawing ring, on the line 3—3 of Fig. 2, but with the ring in its proper upright position.

Referring particularly to the accompanying drawing, the ring comprises an inner smaller wall 10 and an outer larger wall 11, disposed in parallel spaced relation and of semi-elliptical outline. The inner wall 10 is of slightly greater height, as clearly seen in the perspective view and in the sectional view of the drawing, so that when the ring is afloat in the molten glass, in the tank 12, stones and other foreign substances will be excluded from within the inner wall. Connecting the ends of the two walls 10 and 11 are the straight vertical walls 13 and 14, respectively, the wall 13 being of the same height as the wall 10, while the wall 14 is of the same height of the wall 11. The ends of the outer wall 11 are extended beyond the wall 14, as shown at 15, for engagement with the wall of the tank, to prevent the ring from getting too close to said tank wall, and interfering with the proper operation of the glass drawing.

Extending between the side portions of the walls 10 and 11 and spacing said walls apart are the webs 16, while a web 17 is disposed between the bight portions of said walls, and a web 18 between the straight walls 13 and 14.

What is claimed is:

A glass drawing ring including an inner and an outer wall of semi-elliptical outline and disposed in parallel spaced relation, straight walls connecting the respective ends of the semi-elliptical walls and disposed in spaced relation, the said inner wall being of greater depth than the outer wall, and spacing webs disposed between and connected to the curved or semi-elliptical walls and the straight walls.

In testimony whereof, I affix my signature, in the presence of two witnesses.

JOSEPH DURIEUX.

Witnesses:
 A. J. PIRONT,
 RENE J. DURIEUX.